Patented July 29, 1930

1,771,517

UNITED STATES PATENT OFFICE

FRITZ WERNER, OF LEIPZIG, GERMANY

PROCESS FOR THE PRODUCTION OF A COOLING LIQUID POSSESSING A LOW FREEZING POINT

No Drawing. Application filed November 3, 1925, Serial No. 66,676, and in Germany September 23, 1925.

It has become known to produce cooling liquids possessing a low freezing point from a solution mixture of chloride of magnesium and calcium chloride. These known cooling liquids as heretofore prepared, however, have the disadvantage that they contain free acids or residues of the same which corrode the metals.

According to this invention the presence of these noxious constituents of the cooling liquid is prevented by producing in the solution mixture complex-combinations whereby such free acids and their residues are precipitated from the solution.

A solution of calcium chloride of a liquid-density of 41.3° Bé., which has been previously slowly heated to 65° C. by the action of steam, is added under pressure to a solution flowing at comparatively high speed and consisting of chloride of magnesium and a small quantity of a carbohydrate e. g., cane sugar ($C \times H_xyOy$), possessing a liquid-density of 32° Bé. and a temperature of 18° C.

In this process the iron in solution precipitates in the solution of calcium chloride prior to the fusion. When a certain quantity of the second solution has been added to the first and the electric resistance of the mixture is maximum, the free acids and their residues are further quantitatively precipitated completely from the solution as formed or from the liquid, as it cools off. The precipitation of the free acids and their residues which occurs upon the combination of the salt solutions is due to the production in the solution-mixture of complex-combinations without the addition of complex-producers per se, through the formation of tachydride ($CaMgCl_4$) and the process of inversion, according to Werner's Systematic and as explained by W. Ostwald ("Zeitschrift fuer Physikalische Chemie", Vol. 3,596, 1889), and W. Nernst, ("Theoretische Chemie", Stuttgart, Enke, 1926, pages 617 and 628).

The resistance is measured during the process by taking samples from the mixture solution in standard cells by means of alternating current with the aid of universal—precision galvanometers. The formation of the greatest number of complexes which can possibly be obtained, which bring the specific conducting capability into a corresponding relation to the resistance, is in direct proportion to the quantitative precipitation.

The liquid-density sinks after the termination of the process to about 31.5° Bé. The double-salt solution thus prepared is concentrated from and may be diluted with ordinary pure water to vary its strength, i. e., its freezing point, as may be required for use under different service conditions. When slightly diluted to produce a cooling of maximum service strength, the liquid will stand a temperature as low as 48° C. below zero without freezing.

The cooling liquid which has been produced in this manner does not contain any free acid and does not form any free acid when brought into contact with any metal, and may be used continually without corrosive action on metal.

I claim:

1. A process for the production of a cooling liquid possessing a low freezing point, consisting in combining a solution of chloride of magnesium containing a small quantity of a carbohydrate with a heated solution of calcium chloride by forcing the latter-named solution under pressure into a rapidly flowing stream of the first-named solution.

2. A process for the production of a cooling liquid possessing a low freezing point, which consists in combining a previously slowly heated solution of calcium chloride with a solution of chloride of magnesium by forcing the first-named solution under pressure into a stream of the second-named solution flowing at a comparatively high speed.

In testimony whereof I affix my signature.

FRITZ WERNER.